(12) United States Patent
Kapusky et al.

(10) Patent No.: US 10,829,010 B2
(45) Date of Patent: Nov. 10, 2020

(54) SLOUCH SEAT WITH SEAT BASE TILT

(71) Applicant: ADIENT ENGINEERING AND IP GMBH, Burscheid (DE)

(72) Inventors: Michael Kapusky, South Lyon, MI (US); Eric Michalak, Canton, MI (US); Nathan Caruss, Ann Arbor, MI (US); Jennifer Carlson, Ypsilanti, MI (US); Brent Burton, Windsor (CA); Alexander Saveski, South Lyon, MI (US)

(73) Assignee: Adient Engineering and IP GmbH, Burscheid (DE)

( * ) Notice: Subject to any disclaimer, the term of this patent is extended or adjusted under 35 U.S.C. 154(b) by 0 days.

(21) Appl. No.: 16/196,675

(22) Filed: Nov. 20, 2018

(65) Prior Publication Data

US 2019/0152354 A1    May 23, 2019

Related U.S. Application Data

(60) Provisional application No. 62/589,786, filed on Nov. 22, 2017.

(51) Int. Cl.
| *B60N 2/02* | (2006.01) |
| *B60N 2/22* | (2006.01) |
| *F16C 29/04* | (2006.01) |
| *B60N 2/07* | (2006.01) |
| *B60N 2/68* | (2006.01) |
| *B60N 2/06* | (2006.01) |
| *B60N 2/30* | (2006.01) |

(52) U.S. Cl.
CPC .......... *B60N 2/2209* (2013.01); *B60N 2/0224* (2013.01); *B60N 2/06* (2013.01); *B60N 2/07* (2013.01); *B60N 2/0745* (2013.01); *B60N 2/3015* (2013.01); *B60N 2/68* (2013.01); *F16C 29/048* (2013.01); *B60N 2002/0236* (2013.01)

(58) Field of Classification Search
CPC ...... B60N 2/3013; B60N 2/0224; B60N 2/06; B60N 2/0745; B60N 2/2209; B60N 2/07; B60N 2/68; B60N 2/1832; B60N 2/22
USPC .... 297/341, 216.1, 317, 318, 311, 343, 320, 297/340
See application file for complete search history.

(56) References Cited

U.S. PATENT DOCUMENTS

| 4,324,414 | A | * | 4/1982 | Wilkes | A61G 5/006 180/7.1 |
| 4,500,062 | A | * | 2/1985 | Sandvik | B60N 2/39 248/371 |
| 6,352,309 | B1 | * | 3/2002 | Beroth | B64D 11/06 297/354.13 |

(Continued)

FOREIGN PATENT DOCUMENTS

| CN | 204279144 U | 4/2015 |
| WO | 2015/077231 A1 | 5/2015 |

(Continued)

*Primary Examiner* — Chi Q Nguyen
(74) *Attorney, Agent, or Firm* — Marshall & Melhorn, LLC

(57) ABSTRACT

A vehicle seat includes a cushion, a seatback connected to the cushion and a track arrangement. The track arrangement includes a curved fixed track and a flexible track follower that is moveable along the curved fixed track between a full slouch and a full upright position. The curved fixed track is connected to a vehicle seat support base and the moveable track is connected to the cushion.

17 Claims, 16 Drawing Sheets

(56) References Cited

U.S. PATENT DOCUMENTS

| | | | | |
|---|---|---|---|---|
| 7,063,386 B2* | 6/2006 | Dowty | ............... | B60N 2/62 |
| | | | | 297/311 |
| 7,780,230 B2* | 8/2010 | Serber | ............... | B60N 2/0745 |
| | | | | 297/216.1 |
| 10,391,899 B2* | 8/2019 | Ketels | ............... | B60N 2/39 |
| 2006/0055214 A1 | 3/2006 | Serber | | |
| 2008/0023995 A1* | 1/2008 | Ott | ............... | B60N 2/0252 |
| | | | | 297/284.1 |
| 2008/0164740 A1 | 7/2008 | Harper et al. | | |
| 2019/0168640 A1* | 6/2019 | Kapusky | ............... | B60N 2/0715 |
| 2019/0184879 A1* | 6/2019 | Kapusky | ............... | B60N 2/862 |
| 2019/0315252 A1* | 10/2019 | Kapusky | ............... | B60N 2/06 |

FOREIGN PATENT DOCUMENTS

| | | |
|---|---|---|
| WO | 2018/013424 A1 | 1/2018 |
| WO | 2018/022275 A1 | 2/2018 |
| WO | 2018/034903 A1 | 2/2018 |

\* cited by examiner

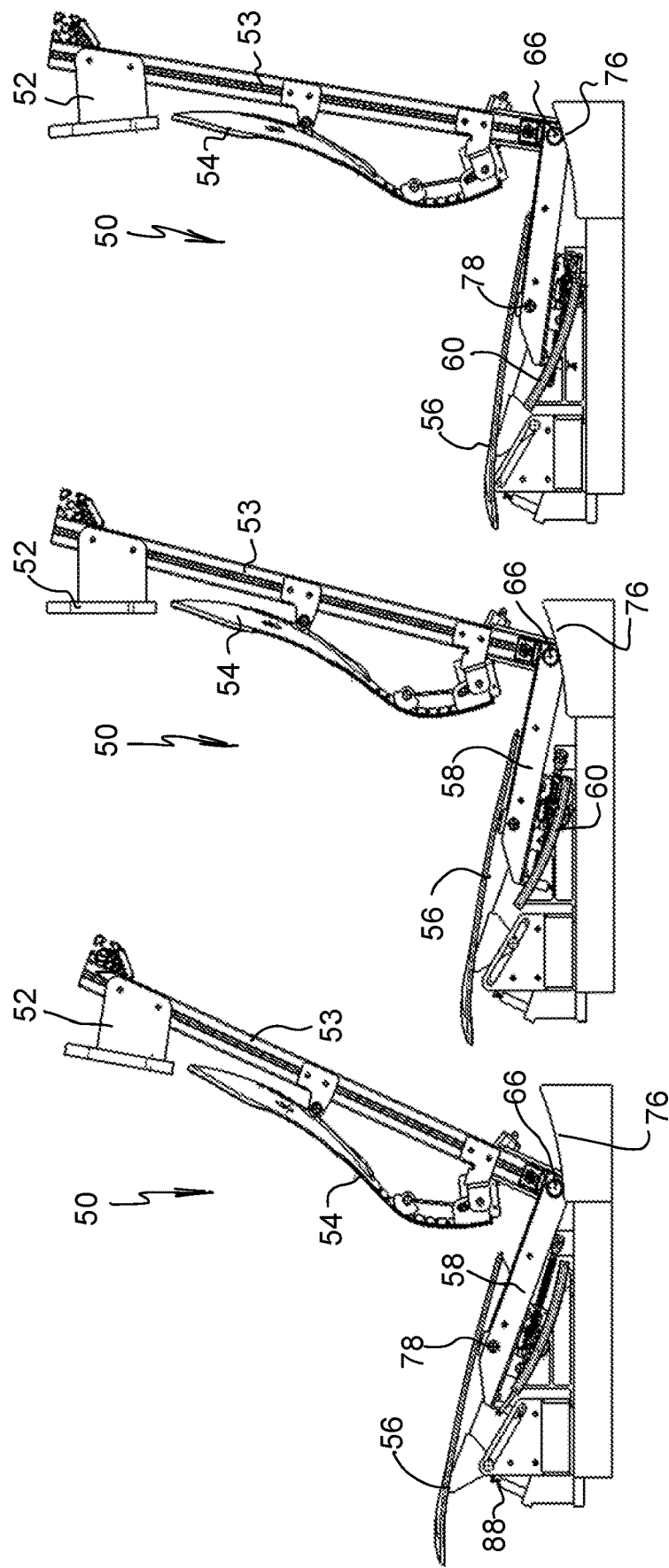

SLOUCH SEAT WITH SEAT BASE TILT

CROSS REFERENCE TO RELATED APPLICATION

This application claims the benefit of priority under 35 U.S.C. § 119 of U.S. Provisional Patent Application 62/589,786, filed Nov. 22, 2017, the entire contents of which are incorporated herein by reference.

FIELD OF THE INVENTION

The present invention relates generally to vehicle seats and more particularly to slouch seats, particularly for vehicles such as automobiles and airplanes.

BACKGROUND OF THE INVENTION

Vehicle seats known as slouch seats have been used in automobiles and aircraft, particularly as second row or rear row seats in front of a bulkhead or vehicle wall. Although there are various configurations to provide a slouch seat, many slouch seat configurations provide for a seatback (backrest) with a lower portion that slides forward as the upper portion slides downwardly. This typically also includes a forward movement of the cushion (seat base). However, the movement of the backrest and the seat base may generate relative movement with respect to the seat occupant. This relative movement is sometimes termed shirt sheer, a sliding movement of the front surface of the backrest relative to the occupant. In a conventional seat, the recliner (pivot fitting) would be placed at the bottom of the seatback and the seatback rotates rearward about the pivot fitting. As the seatback rotates rearward, there is relative motion between the seatback surface and the back of the occupant which can cause the shirt shear. With slouch/recline systems there can also be a loss of thigh contact as the occupant slouches/reclines.

WO 2015/077231 A1 discloses an adjustable vehicle seat configured to support an occupant that includes a seat cushion portion and a seatback (backrest) movable relative to the seat cushion portion and with a contour linkage linked to the seat cushion portion and the backrest. The contour linkage may be configured to impose force on the backrest upon movement of the seat cushion portion relative to the backrest in at least one of a fore/aft, vertical, and rotational direction. The backrest may be configured such that a backrest contour is altered based on force imposed by the contour linkage in response to movement of the seat cushion portion relative to the backrest. The backrest contour may include at least one of a contour angle of an occupant-side surface of the backrest, a maximum offset of the occupant-side surface, and vertical height of a contour apex.

SUMMARY OF THE INVENTION

It is an object of the invention to provide a vehicle seat such as a slouch seat in which the cushion (seat base) tilts to follow the motion of the legs as the occupant slouches/reclines. The tilt of the cushion may advantageously allow the occupant to keep the same heel point.

It is an object of the invention to provide a vehicle seat such as a slouch seat in which the cushion is maintained in constant contact with the occupant's thighs while he or she slouches/reclines.

According to the invention, a vehicle seat is provided comprising a cushion, a seatback connected to the cushion and a track arrangement. The track arrangement includes a curved fixed track and a flexible track follower that is moveable along the curved fixed track between a full slouch and a full upright position. The curved fixed track is connected to a vehicle seat support and the moveable track is connected to the cushion.

The vehicle seat may further comprise a curved seatback track arrangement comprising a curved seatback fixed track and a seatback track follower that is moveable along the fixed track between a full slouch and a full upright position. The fixed seatback track is connected to a backrest support and the moveable seatback track is connected to the seatback. The vehicle seat may further comprise a link arm with a cushion pivot connection between the link arm and the cushion and a link arm and seatback pivot connection between the link arm and the seatback and the moveable track.

The vehicle seat may further comprise a cushion frame that is connected to the track follower. The cushion is pivotably mounted to the cushion frame at a cushion pivot. A cushion tilt angle guide is connected to the cushion and connected to the seat support to control a tilt angle of the cushion relative to the cushion pivot, during movement between the full slouch position and the full upright position. The seatback is connected to the cushion for movement thereof between the full slouch position and the full upright position.

The cushion tilt angle guide may comprise a bracket defining a slot and a pin fixed to the cushion and following a path of the slot for limiting a pivot tilt of the cushion about the cushion pivot during movement between the full slouch position and the full upright position. The cushion tilt angle guide may also comprise a front track and a track follower connected to the front track for following a path of the front track. In this case the cushion is pivotably connected to the track follower for limiting a pivot tilt of the cushion about the cushion pivot during movement between the full slouch position and the full upright position. The cushion tilt angle guide may also comprise a linear actuator pivotably connected to the cushion and pivotably connected to the cushion frame for limiting and/or setting a pivot tilt of the cushion about the cushion pivot during movement between the full slouch position and the full upright position.

The backrest may be fixed to a backrest support comprising a back frame. The back frame is fixed to the cushion frame for movement therewith. The cushion frame carries rollers. The vehicle seat support comprises a curved roller support surface on which the rollers roll to at least partially support the cushion frame and the back frame. With this configuration, the movement from the full upright to the full slouch position results in the back frame tilting rearward and the cushion tilting upward about the cushion pivot. From the full slouch position to the full upright position the back frame tilt forward and cushion tilts downward about the cushion pivot.

The curved tracks provide a cushion tilt, during movement between the full slouch position and the full upright position, to follow a movement of an occupant's legs, during movement between the full slouch position and the full upright position, if a same heel point is maintained. The cushion may be spring biased toward a tilt angle with respect to the cushion pivot The vehicle seat may further comprise a linear locking device with a pivot connection to the vehicle seat support and a pivot connection to the cushion.

The flexible track follower comprises at least a portion that is flexible between ball bearing cages to match a curve of the curved track.

The cushion may be spring biased toward one of the full slouch and a full upright position.

The track arrangement may comprise two fixed curved tracks at one side of the vehicle seat and two fixed curved tracks at another side of the vehicle seat. With this embodiment a track follower is moveable along each respective fixed track between a full slouch and a full upright position.

This vehicle seat/vehicle seat system of the invention advantageously increases the surface area of contact to the occupant's thighs in all positions of the seat system motion. This has greater overall contact area to the occupant provides a higher degree of comfort. The vehicle seat/vehicle seat system of the invention provides motion following the natural kinematics of the occupant as he/she slouches.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

FIG. 20 is a side view of the vehicle seat of FIG. 14, shown in the full recline (slouch) position;

FIG. 21 is a side view of the vehicle seat of FIG. 14, shown in the design position;

FIG. 22 is a side view of the vehicle seat of FIG. 14, shown in the full upright position;

DESCRIPTION OF THE PREFERRED EMBODIMENTS

Figure 1:
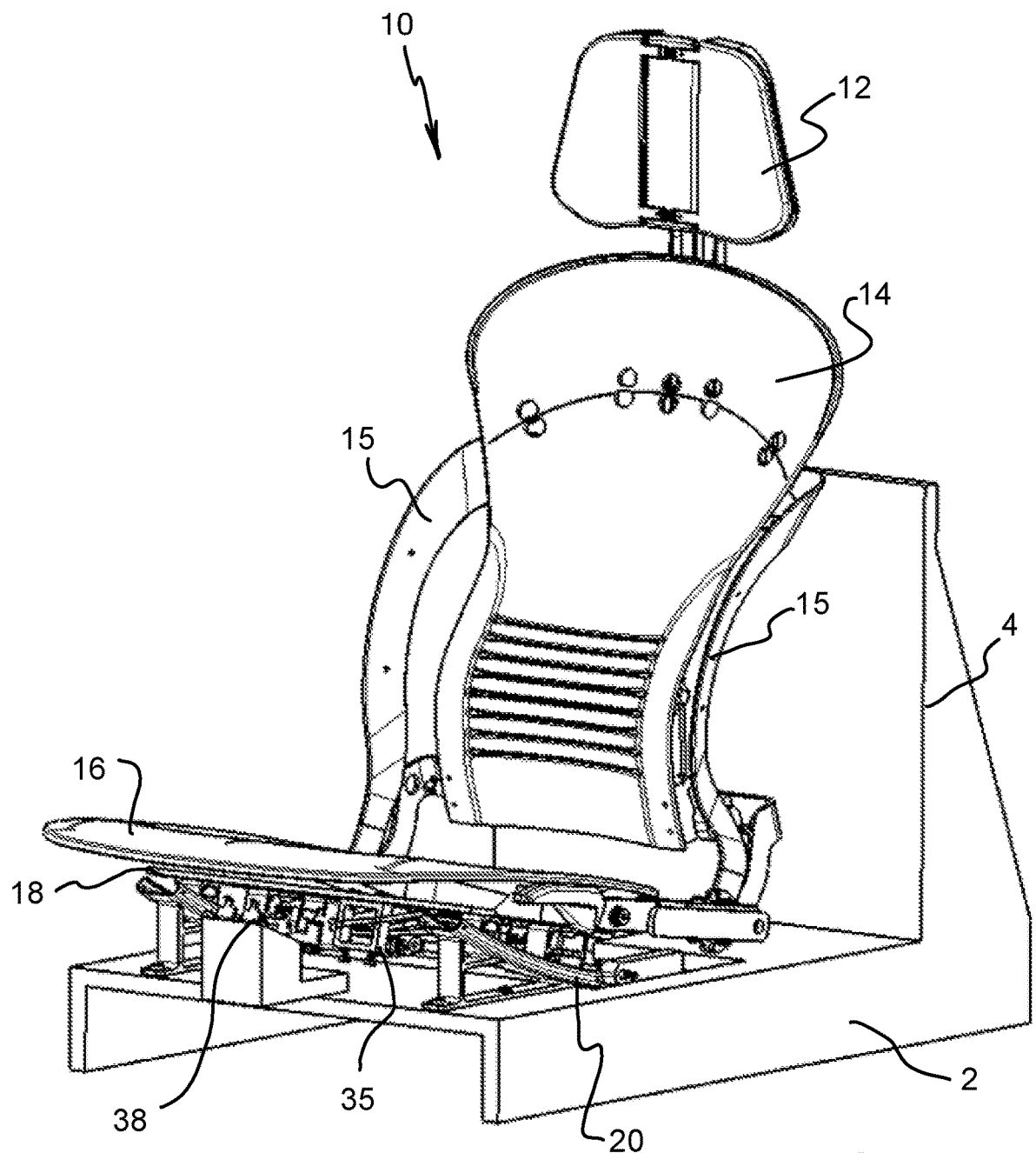
FIG. 1 is a front perspective view of a vehicle seat according to the invention.
Figure 2:
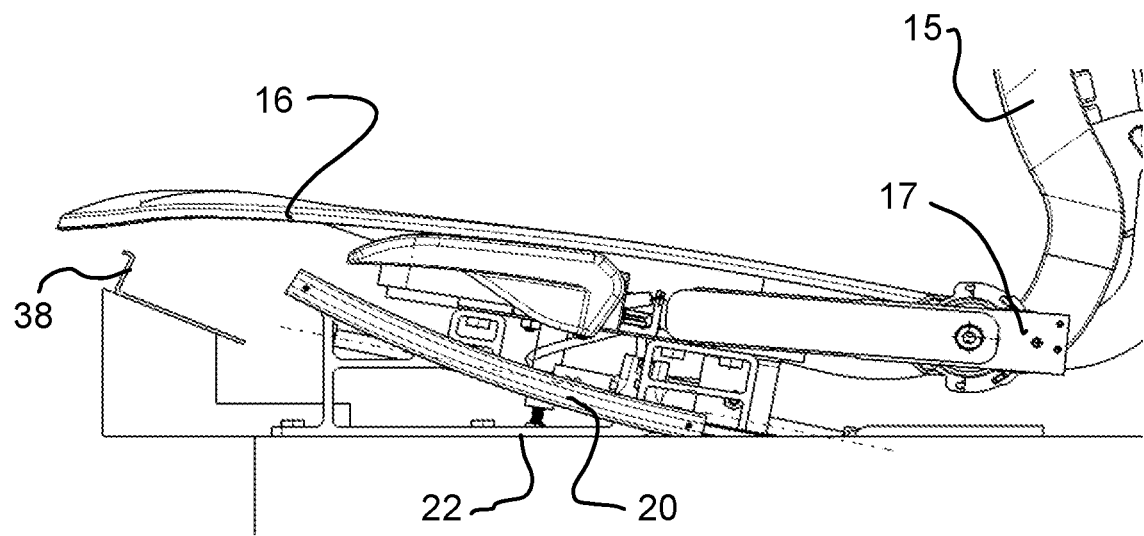
FIG. 2 is a partial side view showing the vehicle seat of FIG. 1 in a full upright position.
Figure 3:
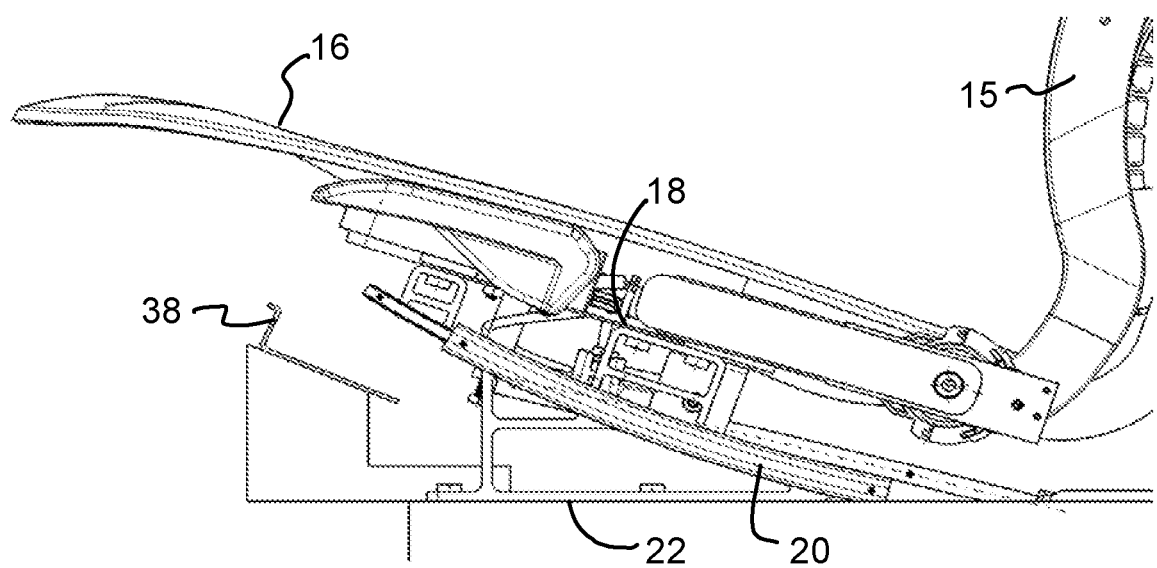
FIG. 3 is a partial side view showing the vehicle seat of FIG. 1 in a full recline (slouch) position.

Referring to the drawings, FIG. 1 shows a vehicle seat generally designated 10 to be used in a vehicle with a vehicle seat support base 2. The seat support base 2 could be the vehicle floor or could be a part of the vehicle seat 10. The vehicle seat 10 may cooperate with a backrest support or back frame 4 which may be part of the vehicle seat 10 or may be a part of the vehicle such as a bulkhead/vehicle wall. If the support base 2 and the back frame 4 are a part of the vehicle seat 10, the support base 2 may itself be supported on the vehicle floor and may move, via a longitudinal adjustment track, fore and aft with regard to a vehicle direction of travel.

Figure 4:
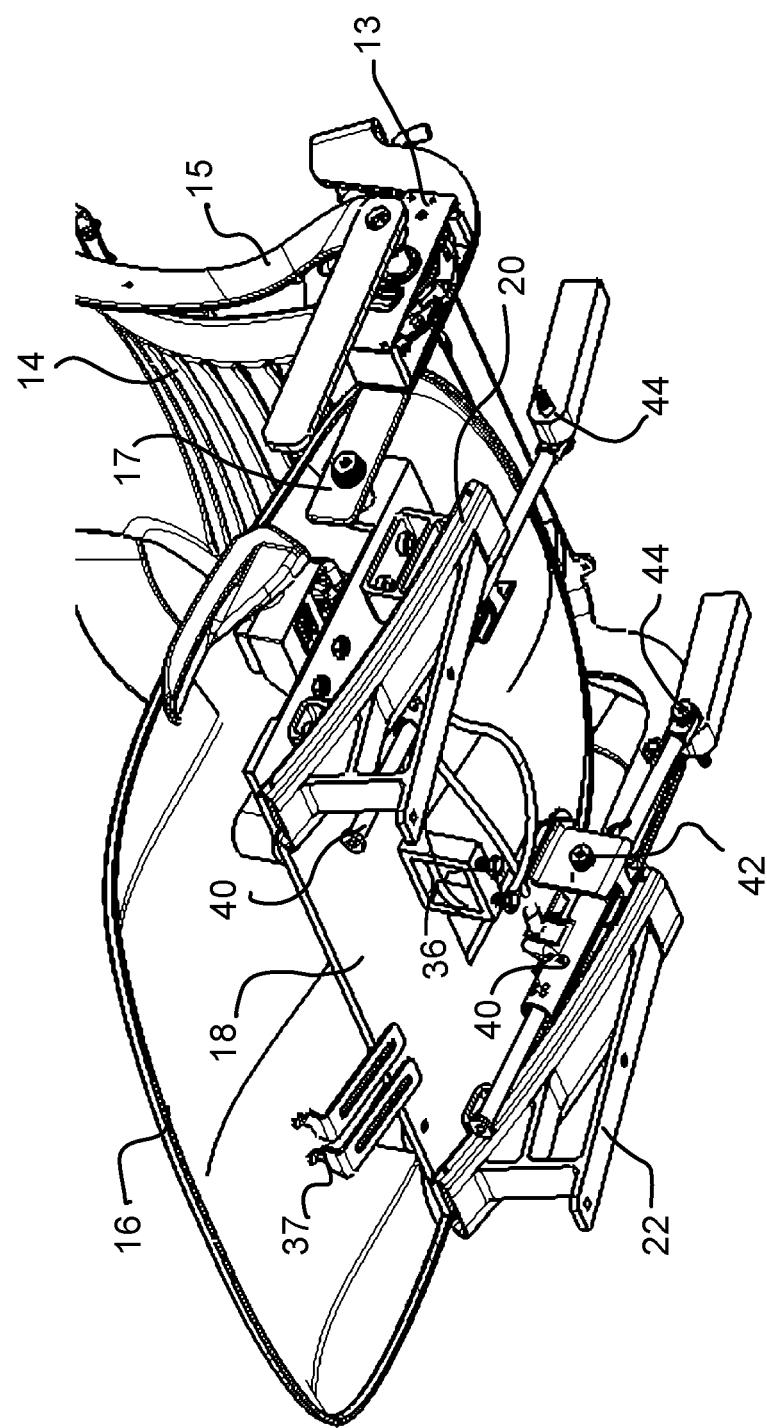
FIG. 4 is a partial perspective view of the vehicle seat of FIG. 4, viewed from below and without showing a support base.
Figure 5:
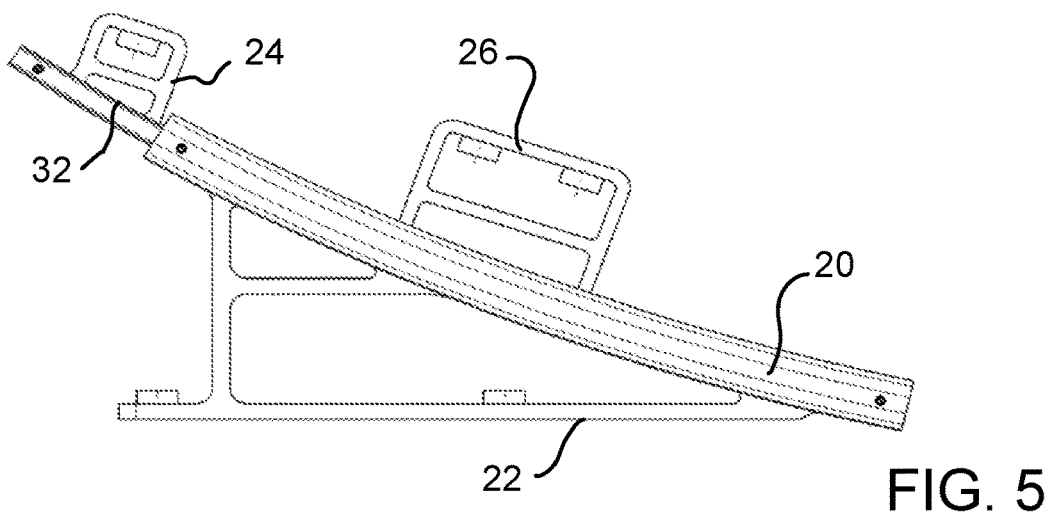
FIG. 5 is a side view of a curved track and track base mounting element of the vehicle seat of FIG. 1, showing the track with a track follower (moveable track) in a full recline (slouch) position.
Figure 6:
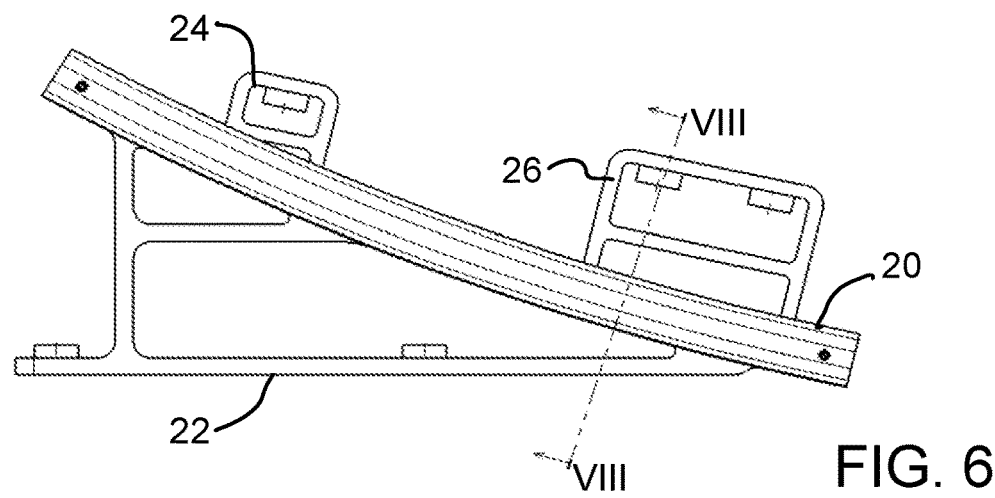
FIG. 6 is a side view of a curved track and track base mounting element of the vehicle seat of FIG. 1, showing the track with the track follower in a design position.
Figure 7:
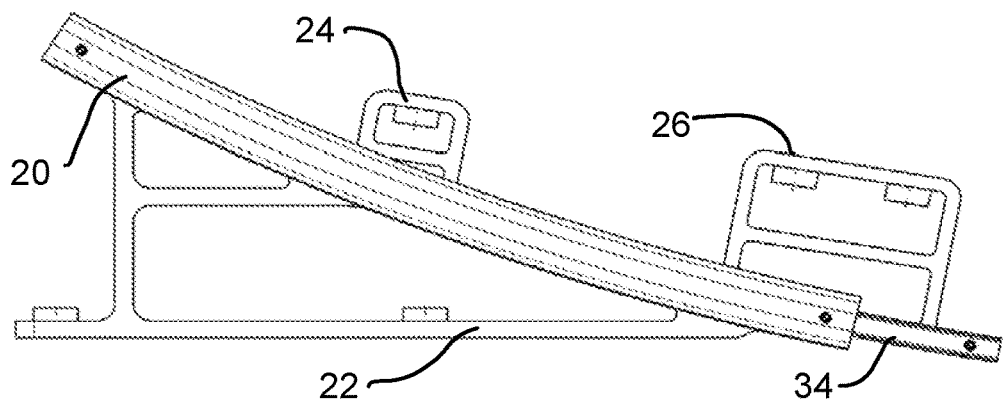
FIG. 7 is a side view of a curved track and track base mounting element of the vehicle seat of FIG. 1, showing the track with the track follower in a full upright position.
Figure 8:
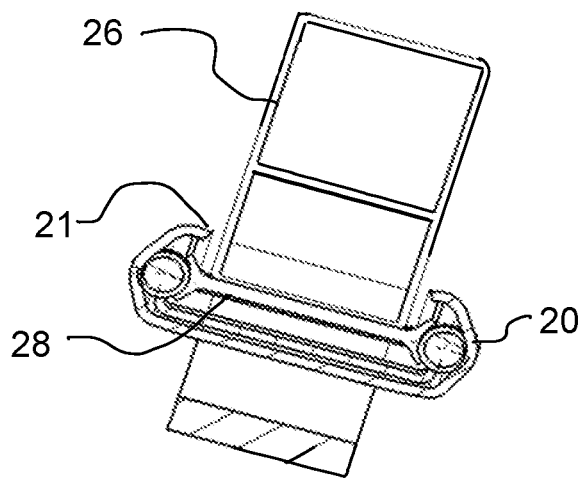
FIG. 8 is a cross-sectional view taken along line VIII-VIII of FIG. 6.
Figure 9:
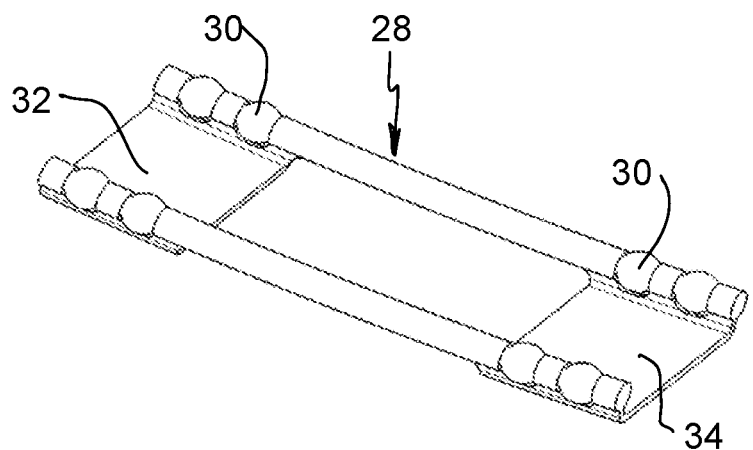
FIG. 9 is a perspective view of a track follower with ball bearings and cage of the vehicle seat of FIG. 1.
Figure 10:
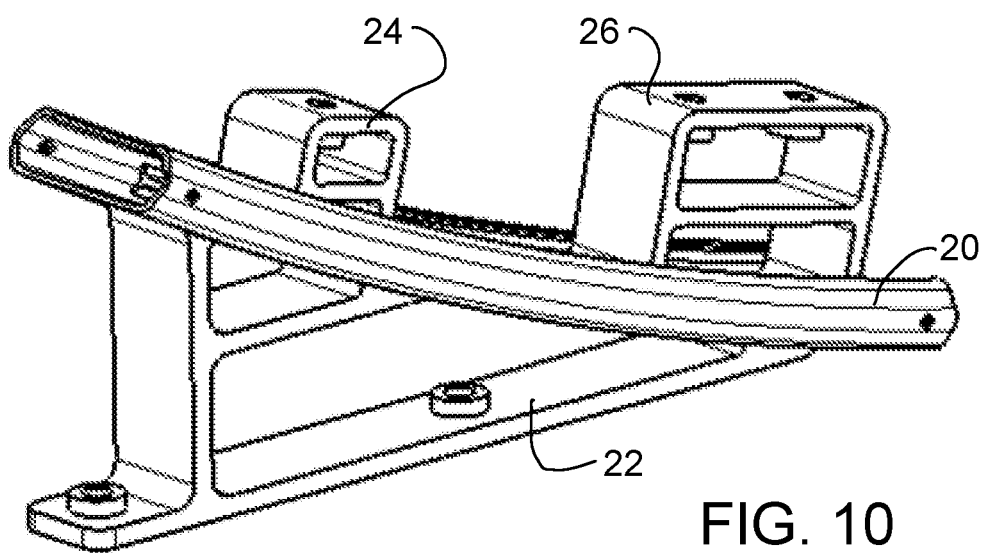
FIG. 10 is a perspective view of a curved track and track base mounting element of the vehicle seat of FIG. 1.

The vehicle seat 10 comprises a headrest assembly 12, a seatback (backrest) 14 and a cushion (seat base) 16. The vehicle seat 10 includes a link arm 15 which connects the seatback 14 to the cushion 16 at a lower link arm part 17. The vehicle seat 10 includes a cushion frame 18, on which the cushion 16 is mounted. The cushion frame 18 is mounted for movement along curved tracks 20. The seatback 14 is mounted for movement along a curved seatback track arrangement 11 that comprises a curved fixed track (fixed to the back frame 4) and a flexible curved seatback track follower (a track follower 28 discussed below) connected to the curved fixed track. The link arm 15/link arm part 17 is connected via a seatback pivot connection 9 to the seatback 14 and to the flexible curved seatback track follower of the curved seatback track arrangement 11. The link arms 15 may function as bolsters for the vehicle seat 10. The vehicle seat 10 includes an actuator 13. One of the curved seat tracks 20 is provided on each side of the vehicle seat (FIG. 4). The curved tracks 20 are each supported by a base mounting element 22. Each base mounting element 22 is fixed (via bolts or the like) to the vehicle seat support base 2. A movable track/ball bearing and cage arrangement track follower 28 is configured to move along the curved track 20. The track follower 28 includes ball bearings 30 supported by a cage structure and further includes a forward movable support 32 and a rear movable support 34. At least the structure between the forward movable support 32 and the rear movable support 34 and adjacent straws or cylinders (e.g., between the cages and the support portions 32, 34) flex so as to follow the curve of the curved track 20. Various materials can be provided to allow for this flexing including but not limited to plastics. The support portions 32 and 34 are preferably more rigid but may also flex to some extent. A forward support bracket 24 is mounted on the forward movable support 32. A rear support bracket 26 is mounted on the rear movable support 34. As can be seen in FIGS. 5-7, the movement of the track follower 28, along the curved track 20, positions the forward support bracket 24 and rear support bracket 26 in various locations along the curved track 20 and particularly between a recline (slouch) position as shown in FIG. 5 and a full upright position as shown in FIG. 7. FIG. 6 shows what is referred to as a design position, which may be a position between the recline (slouch) position and the full upright position. Based on this configuration, cushion 16 and the cushion frame 18 move along a path defined by the curved tracks 20. The curved tracks 20 can be mounted between the cushion frame 18 and the support base 2 in various ways. Further, the track can be configured with each track rotated 90° and the curved portion being perpendicular to the direction of the curve as shown (for example, with a track open region 21 of the curved tracks 20 facing inwardly or outwardly and with the support brackets 24 and 26 extending horizontally out of the track open region 21).

Figure 13:
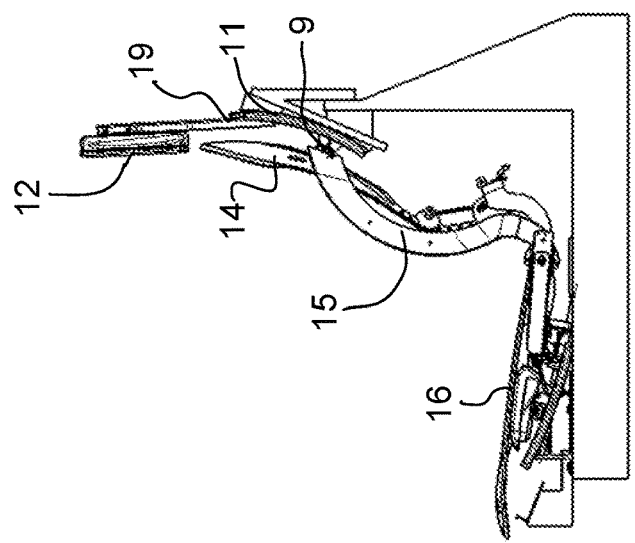
FIG. 13 is a side view of the vehicle seat of FIG. 1 shown in the full upright position.
Figure 12:
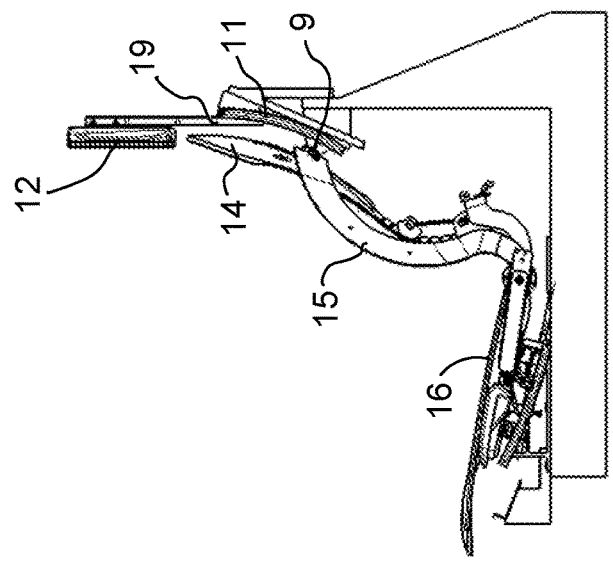
FIG. 12 is a side view of the vehicle seat of FIG. 1 shown in the design position.
Figure 11:
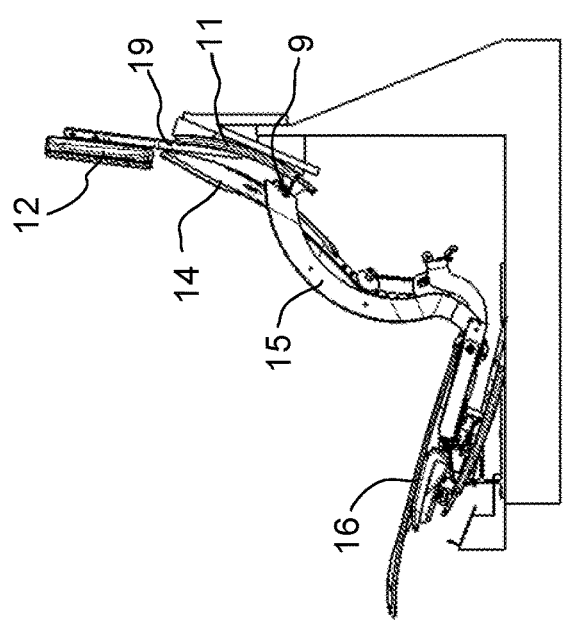
FIG. 11 is a side view of the vehicle seat of FIG. 1 shown in the full recline (slouch) position.

The cushion frame 18 is connected to the seatback 14 by link arms 15 at lower link arm parts 17 (FIG. 4). The seatback 14 of vehicle seat 10 also moves along a seatback (backrest) track, supported by the seatback support—back frame 4, as disclosed in International Application PCT/US17/41151, filed Jul. 7, 2017 (corresponding WO 2018/013424 A1 is incorporated herein by reference in its entirety). The headrest assembly 12 is configured as a headrest follower arrangement, connected to the curved seatback track arrangement 11 by a headrest follower connection 19 (FIGS. 11-13). The headrest assembly 12 moves and is repositioned as the seatback 14 moves along the curved seatback track arrangement 11 and the cushion 16 moves along curved track 20 to move between the full up position and a full recline position as disclosed in International Application PCT/US17/46029, filed Aug. 9, 2017 (corresponding WO 2018/034903 A1 is incorporated herein by reference in its entirety).

The configuration of the vehicle seat 10 allows the movement of the headrest assembly 12, the seatback 14 and the cushion 16 between a full upright position and a full recline (slouch) position with the motion of the occupant's legs, changing the thigh angle while keeping a constant heel point. The configuration of vehicle seat 10 is particularly advantageous in following the occupant's natural motion. The configuration minimizes the occupant's shift fore/aft and keeps the occupant to vehicle position more consistent. The curve of the curved tracks 20, tilts the cushion such that there is less fore/aft shift of the occupant.

The vehicle seat 10 further includes one or two linear locking devices 40 which can set and fix a position of the cushion 16 (as will as the seatback 14 and headrest assembly 12) in any position between the full recline position (FIG. 12) and a full upright position (FIG. 13). In the alternative, a linear power device (a form of a linear locking device) 80 (FIGS. 17 and 24) is used to set the position. The vehicle seat 10 is biased toward the full recline position. This allows the occupant to use their body, to push the seat into a desired position, and then fix the position with the linear locking devices 40. This bias is effected with the provision of one or more springs connected between a spring base support 38 and one or both of spring cushion support connection 37 at the cushion 16 and/or at the spring cushion frame support 36 at the cushion frame 18 (FIG. 4). The spring base support 38 and the spring cushion support connection 37 and spring cushion frame support 36 allow for one or two extension springs to be added if needed. The spring or springs assist the occupant when moving from full upright to full recline. The springs are advantageously provided for the manual version with the two linear locking devices 40. The two linear locking devices 40 are each provided with a locking device cushion pivot 42 and a locking device support base pivot 44. The pivot connections 42 allow the locking device 40 to operate through the range of motion of the cushion 16 along the curved tracks 20. Features of the locking device are discussed in further detail in International Application PCT/US17/41105, filed Jul. 7, 2017 (corresponding WO 2018/022275 A1 is incorporated herein by reference in its entirety).

The curved tracks 20, under the cushion 16 and cushion frame 18, provide a tilt to the cushion 16 such that the cushion 16 follows the movement of the occupant's legs as he or she moves to recline with the flu upright position if the same heel point is maintained. The headrest assembly 12 also follows the occupant's movement. In particular, the headrest assembly 12 tilts rearward and the cushion tilts upward (at the front) as the vehicle seat 10 moves from the design position or the full upright position to the full recline position (compare FIGS. 12 and 13 to FIG. 11). From the recline or the design position to the full upright position the headrest tilts forward and the cushion 16 tilts downward (compare FIGS. 11 and 12 to FIG. 13).

Figure 14:
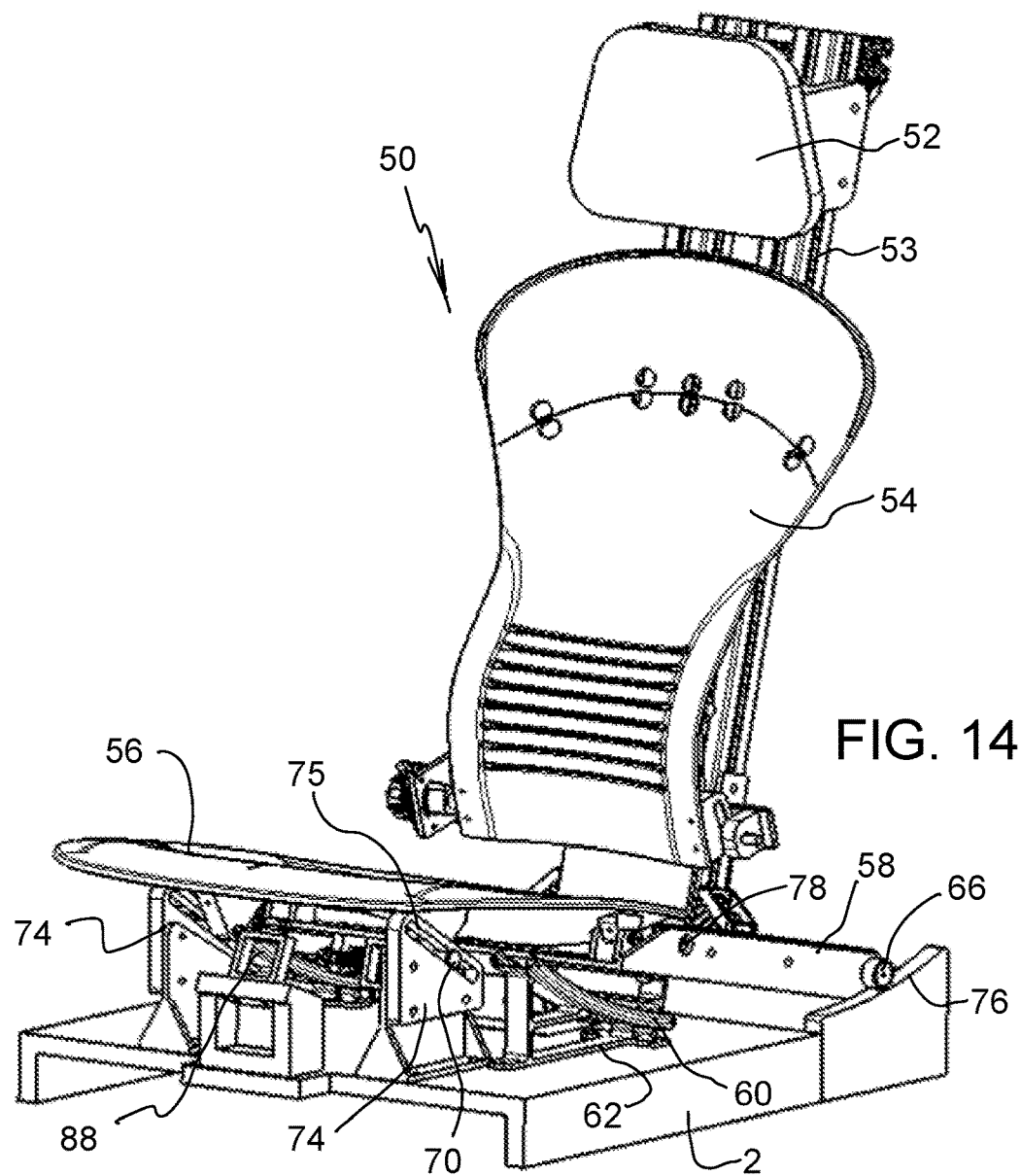
FIG. 14 is a front perspective view of a second embodiment of a vehicle seat according to the invention.
Figure 15:
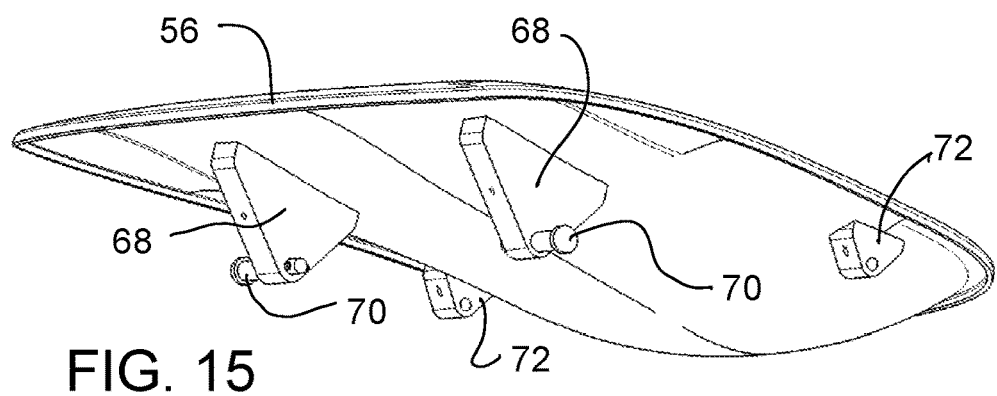
FIG. 15 is a perspective view showing a seat base of the vehicle seat of FIG. 14 viewed from below.
Figure 16:
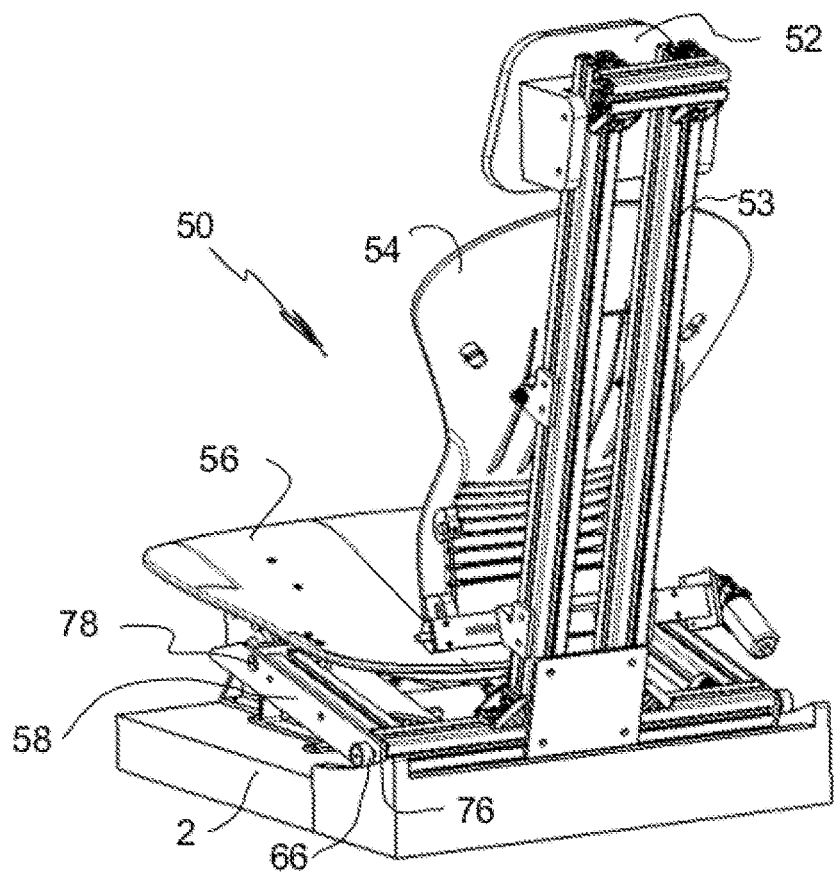
FIG. 16 is a rear perspective view of the vehicle seat of FIG. 14.

FIG. 14 shows a vehicle seat 50 according to a second embodiment of the invention. Several aspects of the vehicle seat 50 are the same as the vehicle seat 10. However, the vehicle seat 50 provides both curved tracks 60 below a cushion frame 58 of a cushion 56 as well as a curved roller support surface 76 for interacting with rollers 66 of the cushion frame 58. A seatback 54 is fixed on a back frame 53. A headrest assembly 52 is also fixed on the back frame 53. The curved tracks 60 and the curved roller support surface 76 are such that the headrest assembly 52 as well as the seatback 54, rigidly mounted to the back frame 53, tilt together with the movement of the cushion frame 58, to which the back frame 53 is rigidly connected. Each of the curved tracks 60 is supported via a base mounting element 62 at the support base 2. The track follower 28 is essentially as shown previously but supports a support bracket 64 which in turn is connected to the cushion frame 58. The cushion frame 58 is configured to follow the path of the track 60 and to also, via cushion frame rollers 66, follow the curve of roller support surface 76. The roller support surface 76 has essentially the same curve as the curved tracks 60. Unlike the vehicle seat 10, the cushion 56 is mounted to the cushion frame 58 at the rear of the cushion 56, to pivot about cushion pivot 78, which is formed at the cushion frame 58. The tilt movement of the cushion is restrained at the front by front cushion pins 70 that travel in slots 75 of the respective slot brackets 74. As can be seen in FIG. 15, the lower side of the cushion 56 includes front cushion blocks 68 which each support the front cushion pivots 70. At the bottom rear of the seat cushion 56 rear cushion blocks 72 have openings or pins, cooperating with the cushion frame 58, that has cooperating openings or pins, to form the cushion pivots 78. The slot brackets 74, that provide slots 75, are fixed relative to the support base 2 and the front cushion pins 70 are attached to the cushion 56. The shape of the slots 75 is such that the angle of the cushion 56 follows the occupant's movement as the occupant moves the vehicle seat 50, allowing the occupant to keep the same heel point. This forms a cushion front guide or cushion tilt guide.

The vehicle seat 50 and other vehicle seats (50' and 110) discussed below provide seat systems in which the cushion tilts to follow the motion of the legs as the occupant slouches/reclines while keeping the same heel point. The intention is to maintain constant contact with the occupant's thighs while he or she slouches/reclines. These systems are also intended to increase the surface area of contact to the occupant's thighs in all positions of the seat system motion. This is based on concept that a greater overall contact area of the seat and the occupant results in a higher comfort rating. The cushion tilt features increase the overall contact area to the occupant area as the occupant adjusts the seat to recline/slouch.

Figure 17:
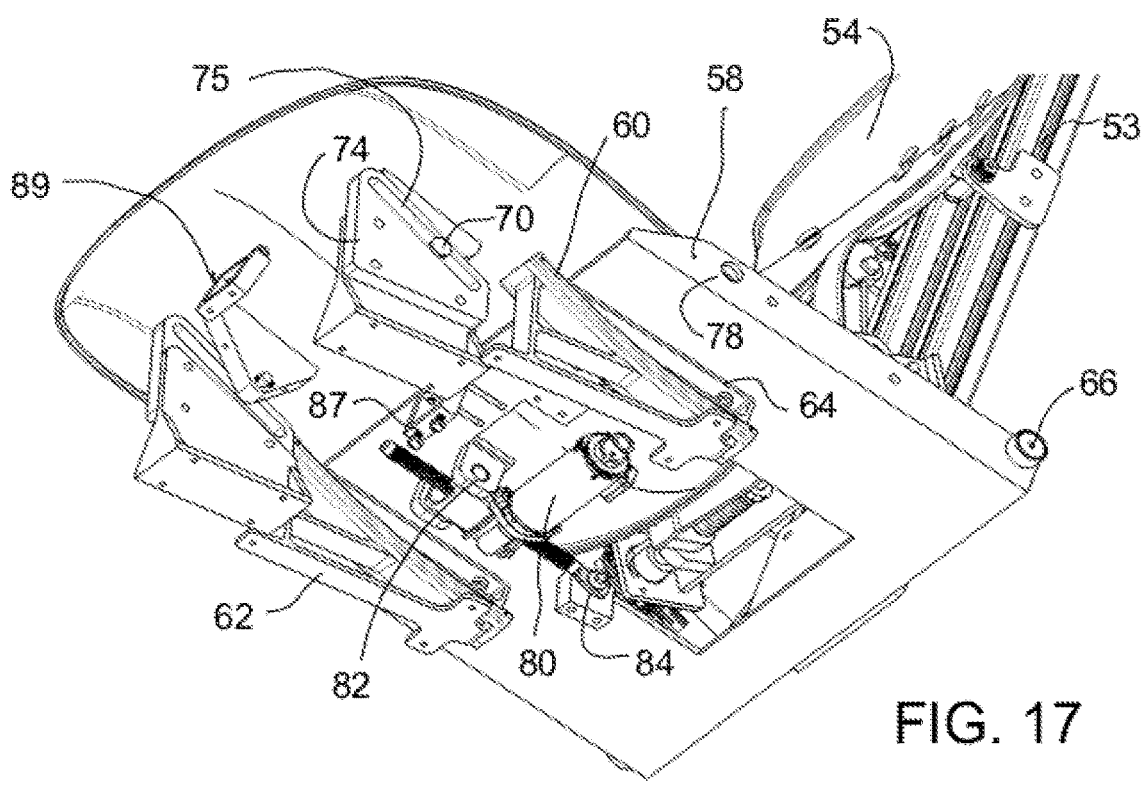
FIG. 17 is a partial perspective view of the vehicle seat of FIG. 14, viewed from below.
Figure 24:
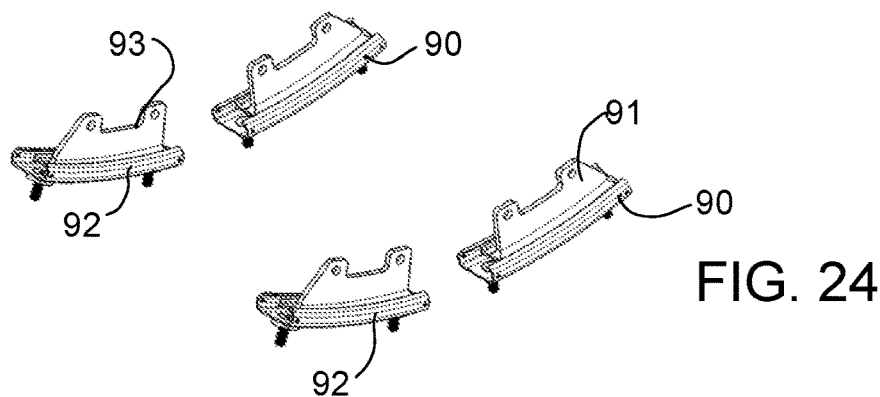
FIG. 24 is a perspective view showing the four curved tracks of the vehicle seat of FIG. 23.
Figure 25:
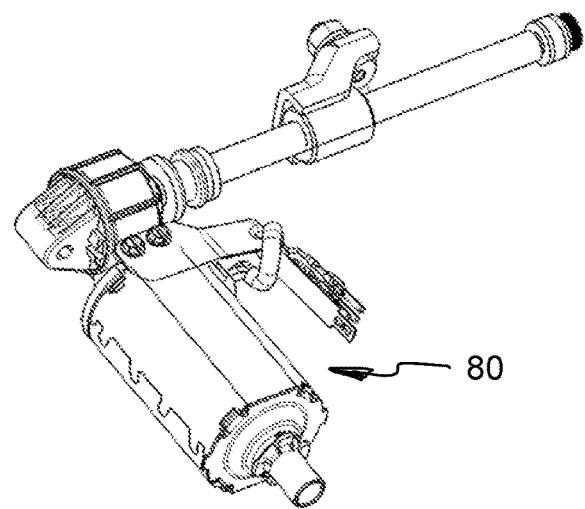
FIG. 25 is a perspective view showing a linear power device of the vehicle seat of FIG. 23.

The vehicle seat 50 may be biased toward the recline position such that the force of the body of the occupant is used to move the vehicle seat 50 toward the upright position against the bias force. To provide this bias, one or more springs are connected at spring cushion frame connection 87 (FIG. 17) and at the spring base connection 88 of the base 2, to bias the cushion frame 58 toward the recline position (FIG. 20). Cushion 56 may also be provided with a spring support connection 89 with a spring that connects to the spring base connection 88, which is fixed to the seatback 2. This biases the cushion 56 toward the recline position. One or more linear locking devices 40 may be used to fix the position of the cushion frame 58 and the back frame 53. However, the vehicle seat 50 may also be provided with a linear power device (a form of a linear locking device) 80 (FIGS. 17 and 24). In a manner similar to the linear locking devices, the linear power device 80 connects to a linear power device support base pivot 84, supported by the support base 2. Linear power device 80 is also connected to the power device cushion pivot 82, which allows the cushion frame 58 to follow the curved path and allows the cushion frame 58 to be driven into directions by the motor and screw transmission of the linear power device 80.

Figure 18:
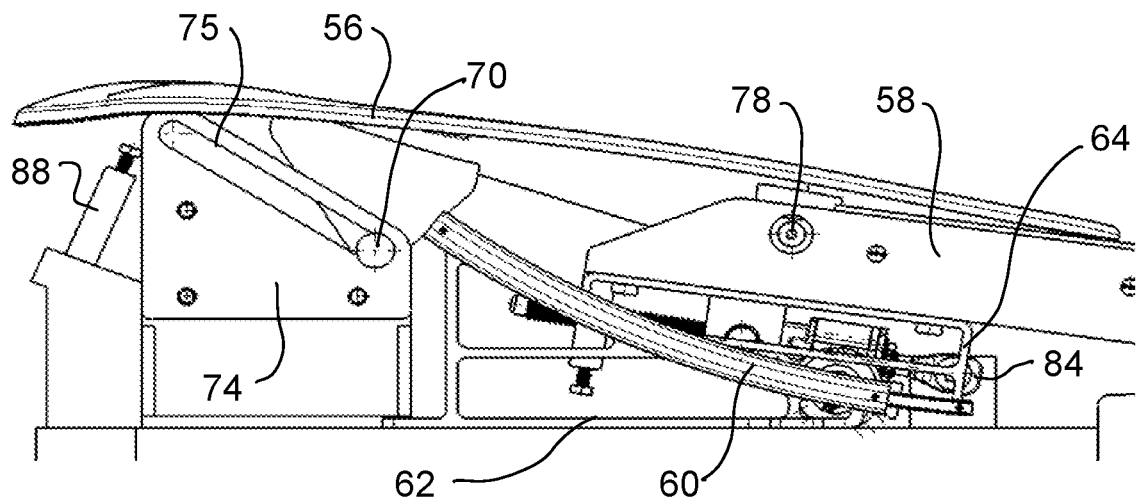
FIG. 18 is a partial side view of the vehicle seat of FIG. 14, shown in the full upright position.
Figure 19:
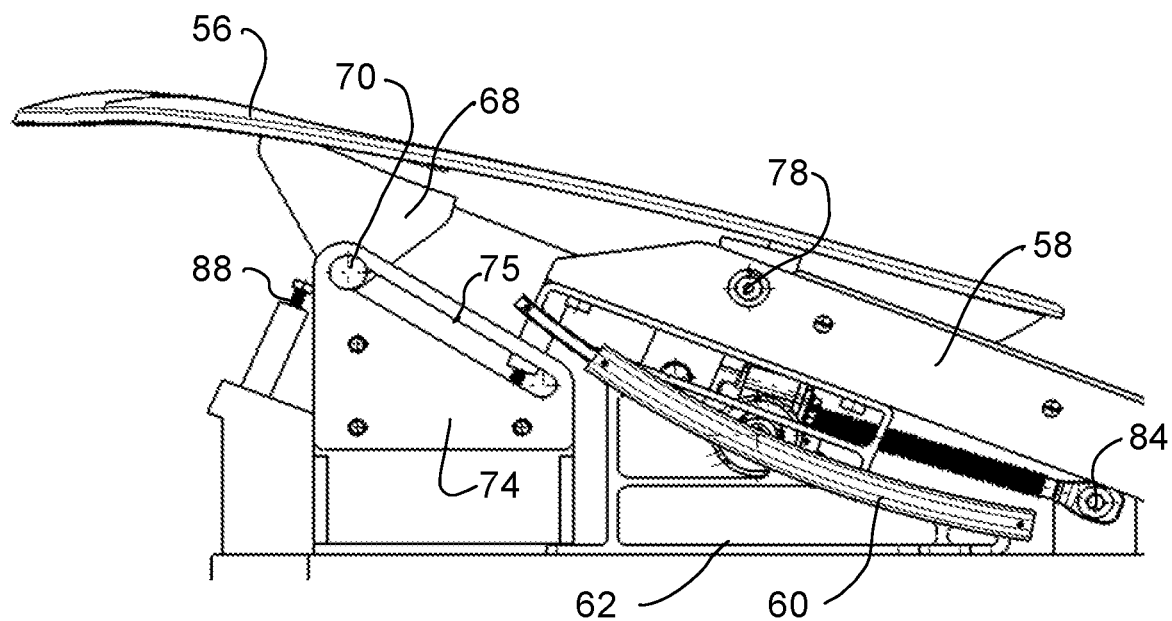
FIG. 19 is a partial side view of the vehicle seat of FIG. 14, shown in the full recline (slouch) position.
Figure 23:
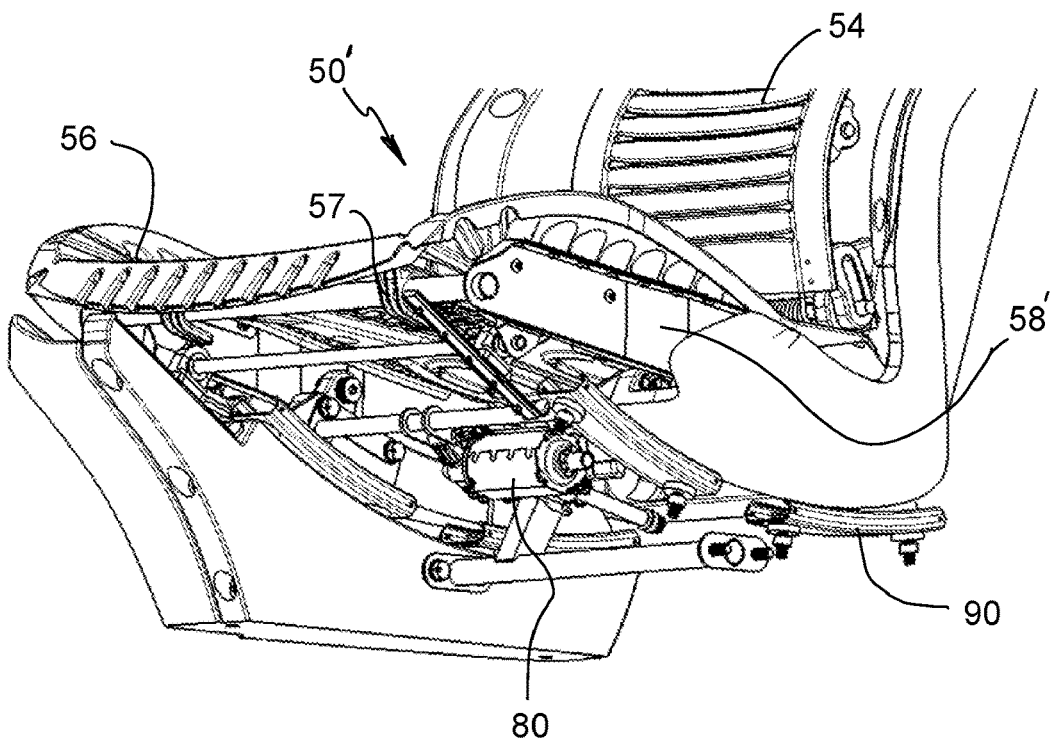
FIG. 23 is a partial perspective view, viewed from below, showing a modified version of the embodiment of FIG. 14.

The configuration of vehicle seat 50, with curved tracks 60 and curved surfaces 76, allows the back frame 53 to tilt rearward as the cushion 56 tilts upward about the cushion pivot 78, as the vehicle seat 50 moves from the full upright position (FIGS. 18 and 22) into the full recline (slouch) position (FIGS. 19 and 20). From the design position (FIG. 21) or the full upright position (FIG. 22) toward the full recline position (FIG. 18) the back frame 53 tilts forward (with the seatback 54 and the headrest assembly 52) and the cushion 56 tilts downward about the cushion axis 78. The cushion pivots at 72. The cushion pivot 78 preferably lines up with the natural motions of the occupant as the occupant moves to the recline/slouch position.

Figure 26:
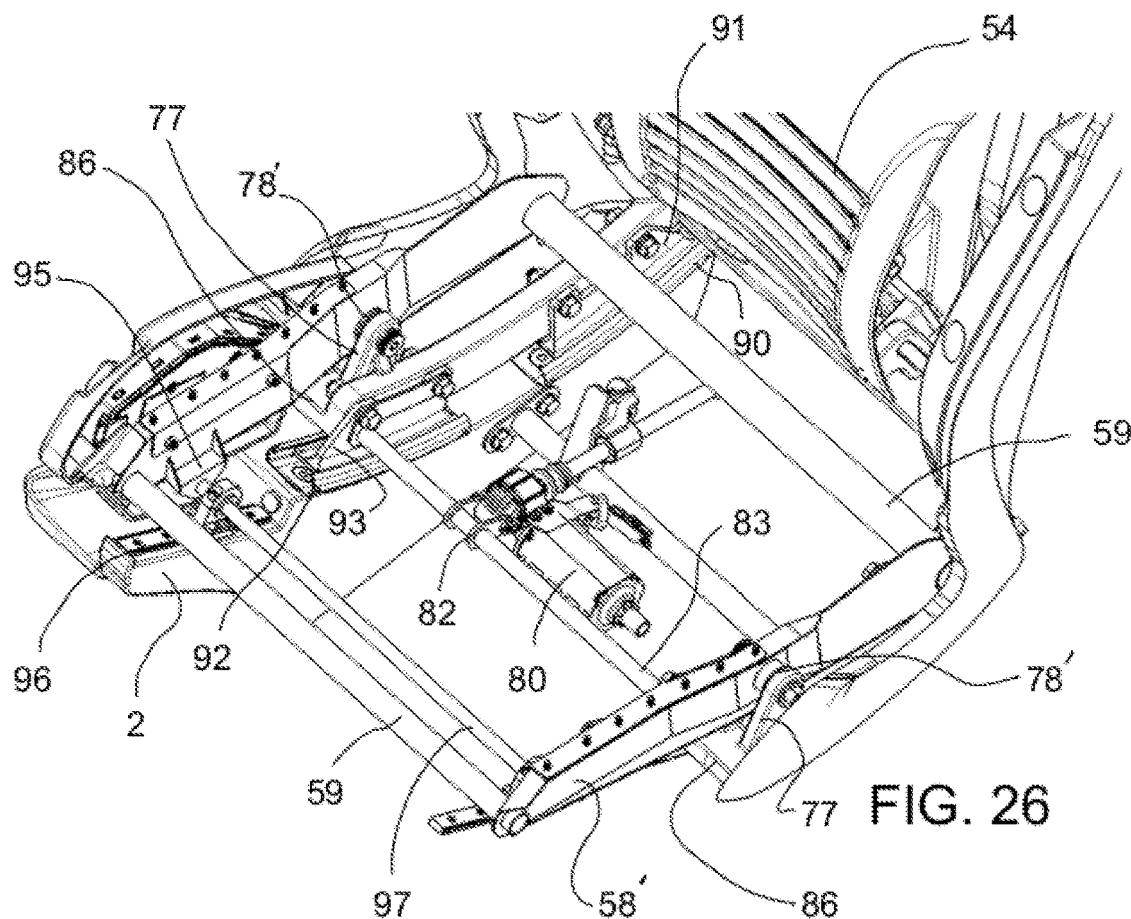
FIG. 26 is a partial perspective view, showing the vehicle seat of FIG. 23, viewed from above with the upper portion of the seat cushion removed.
Figure 27:
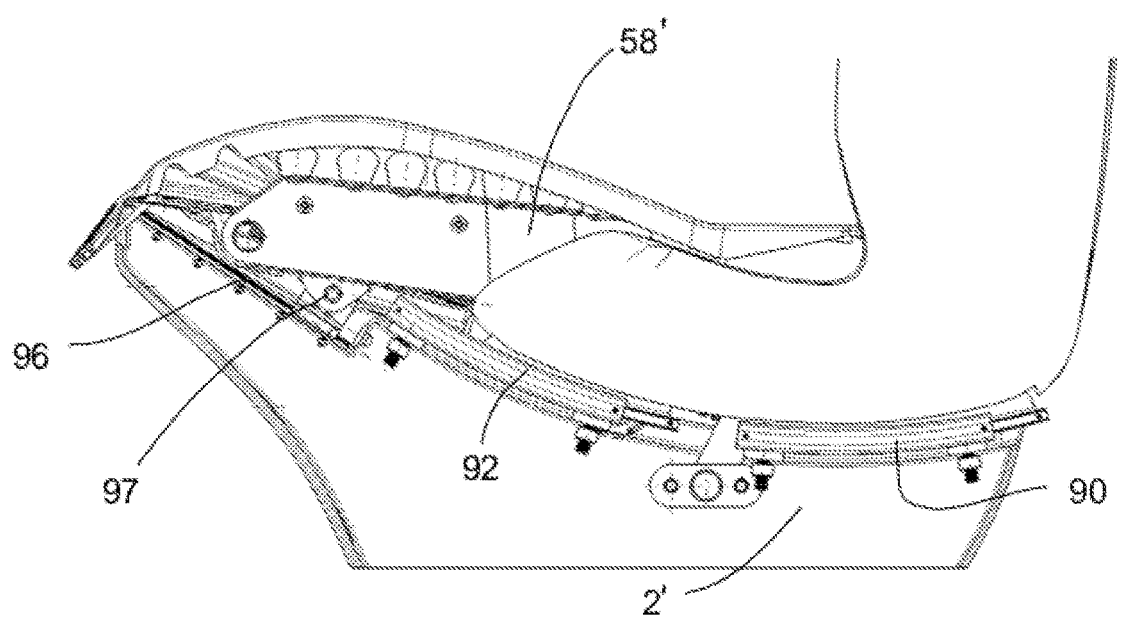
FIG. 27 is a partial side view of the vehicle seat of FIG. 23, shown in the full upright position.
Figure 28:
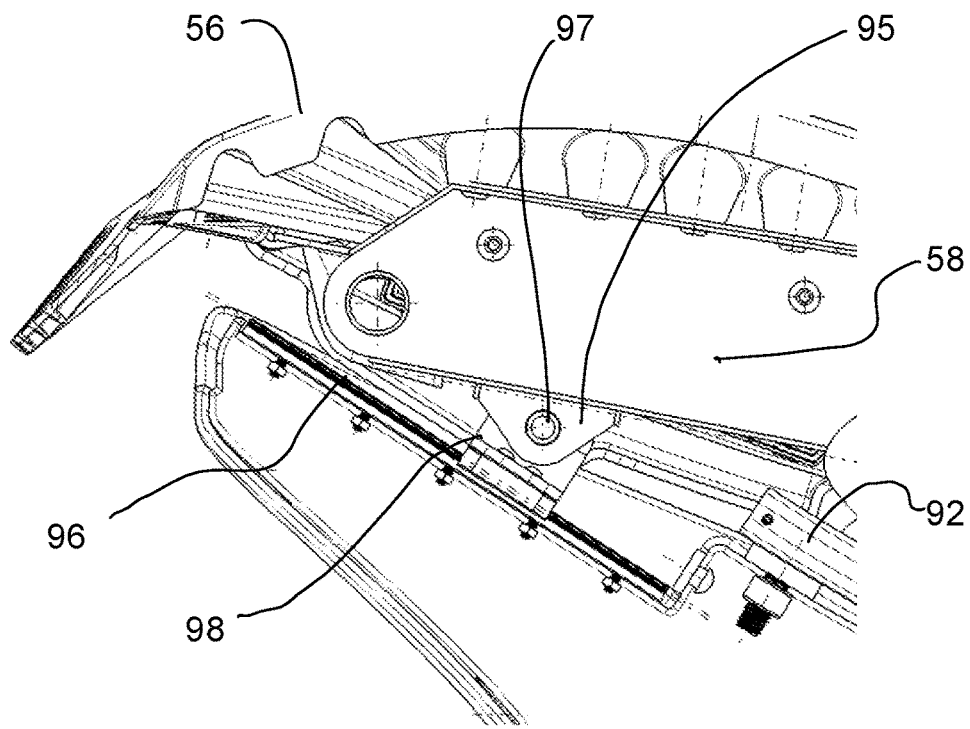
FIG. 28 is a partial side view of the vehicle seat of FIG. 23, shown in the design position.
Figure 29:
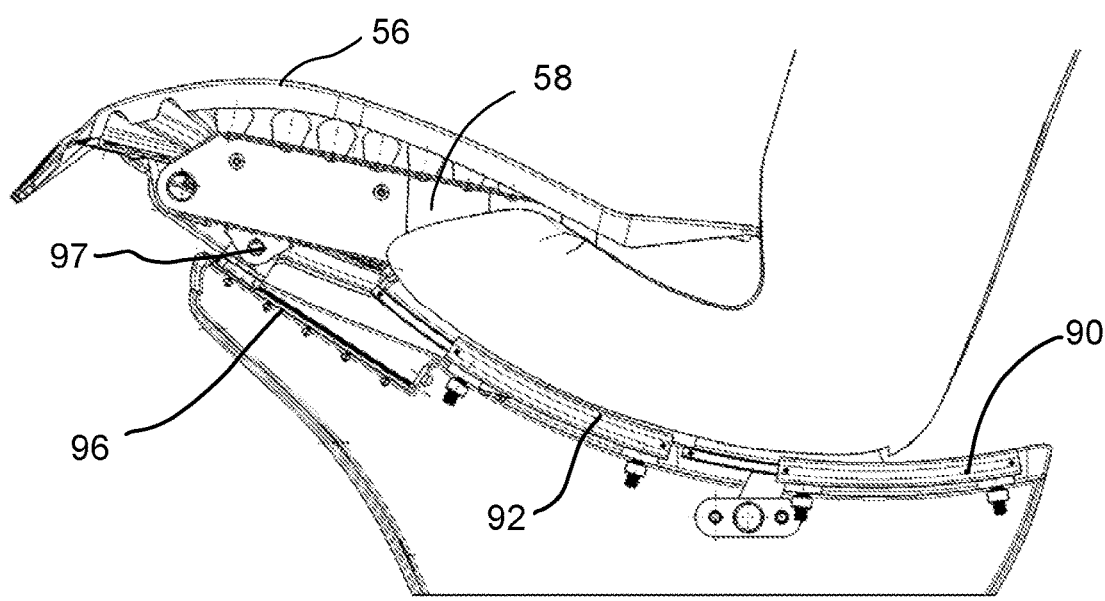
FIG. 29 is a partial side view of the vehicle seat of FIG. 23, shown in the full recline (slouch) position.
Figure 30:
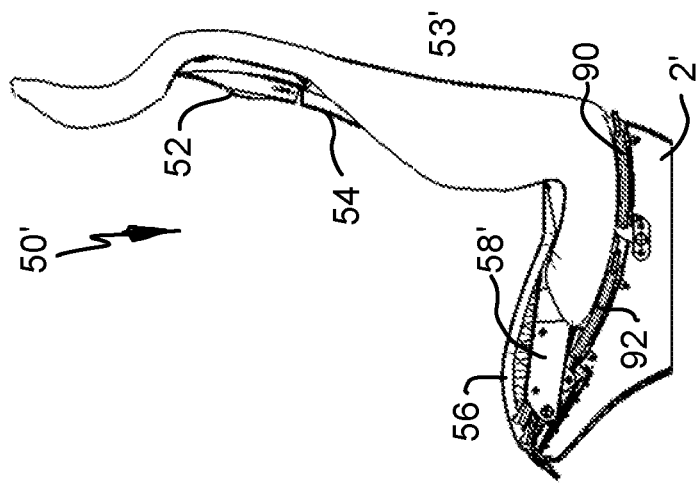
FIG. 30 is a side view of the vehicle seat of FIG. 23, shown in the full recline (slouch) position.
Figure 31:
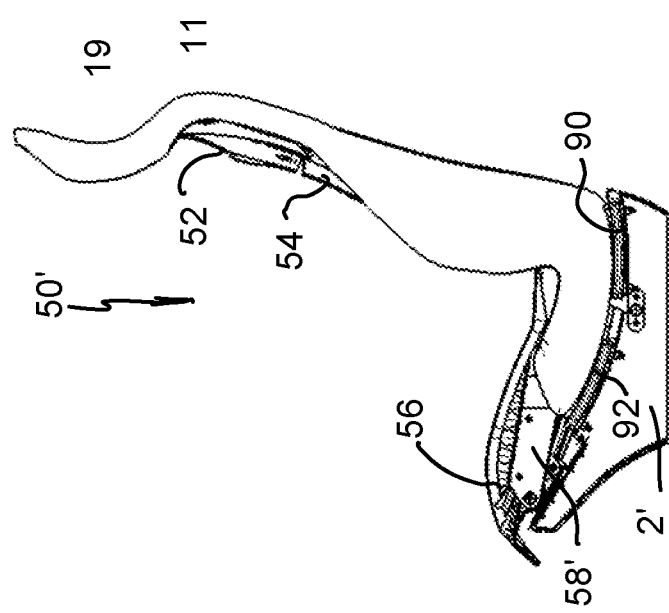
FIG. 31 is a side view of the vehicle seat of FIG. 23, shown in the design position.
Figure 32:
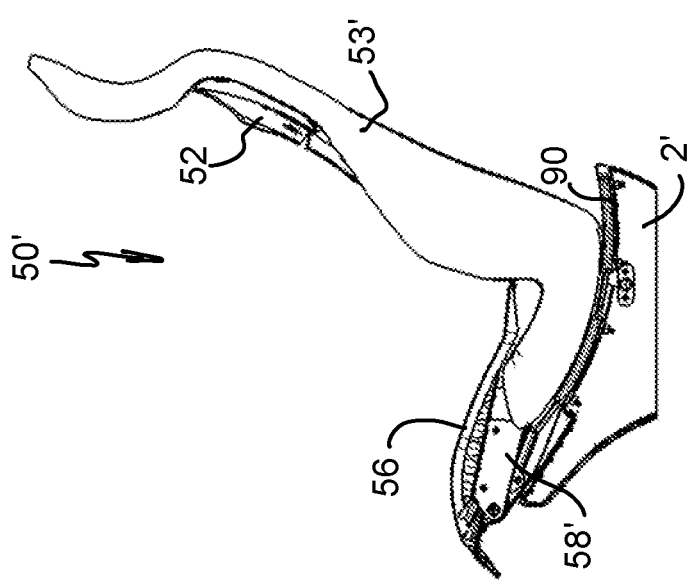
FIG. 32 is a side view of the vehicle seat of FIG. 23, shown in the full upright position.

FIGS. 23 through 32 show a vehicle seat 50', which is a variation of the vehicle seat 50. Instead of the long curved tracks 60 in cooperation with the curved surface 76 and rollers 66, the vehicle seat 50' is comprised of four shorter curved tracks 90, 90, 92, 92 to support corners of the cushion frame 58'. The four short curved tracks 90 and 92 are supported at the support base 2, as can be seen in FIG. 26. The short curved tracks 90 each have a track follower (moveable track) 91 and the short tracks 93 each have a track follower 93. The track followers 91 and 92 are each connected to the cushion carrier frame 86. The cushion carrier frame 86 is in turn provided with cushion frame blocks 77 which support pivots 78'. A cushion frame 58' includes side members connected to pivot at pivots 78. The cushion frame 58' also includes front and rear cushion frame cross members 59 connecting the side members (FIG. 26). At the front, cross member 59 connects to the cushion front frame connection 57. The cushion frame 58' further includes seat cushion frame pivot connections 95 which support a cross member, front pivot 97. Two front tracks 96 are provided on the support base 2 and interact with front track followers 98. Each of the front track followers 98 is also pivotably connected to the front pivot 97. The front pivot 97 with the connection to cushion frame pivot connections 95 and front track followers 98 provides a further configuration for leveling the cushion (controlling the cushion tilt angle) as the seat slouches (reclines). The front tracks 96, front track followers 98, the front pivot 97 and the cushion frame pivot connections 95 present an alternative cushion front guide or cushion tilt guide to the cushion tilt guide provided by slots 75 and front cushion pins 70 of the vehicle seat 50.

The vehicle seat 50' also includes a power linear actuator (a linear locking device) 80. This linear actuator 80 is connected to a pivot bar 83 via a linear power device cushion pivot 82 with the pivot collar connection. The linear power device cushion pivot 82 is in turn connected to track followers 93 at each side. The linear actuator 80 is also pivotably connected to the support base 2. The motor of the linear actuator 80 turns in one of two directions to move the cushion 56, seatback 54 and headrest assembly 52 between the full upright position, shown in FIG. 32, through the design position, shown in FIG. 31, to the full recline (slouch) position shown in FIG. 30.

Figure 33:
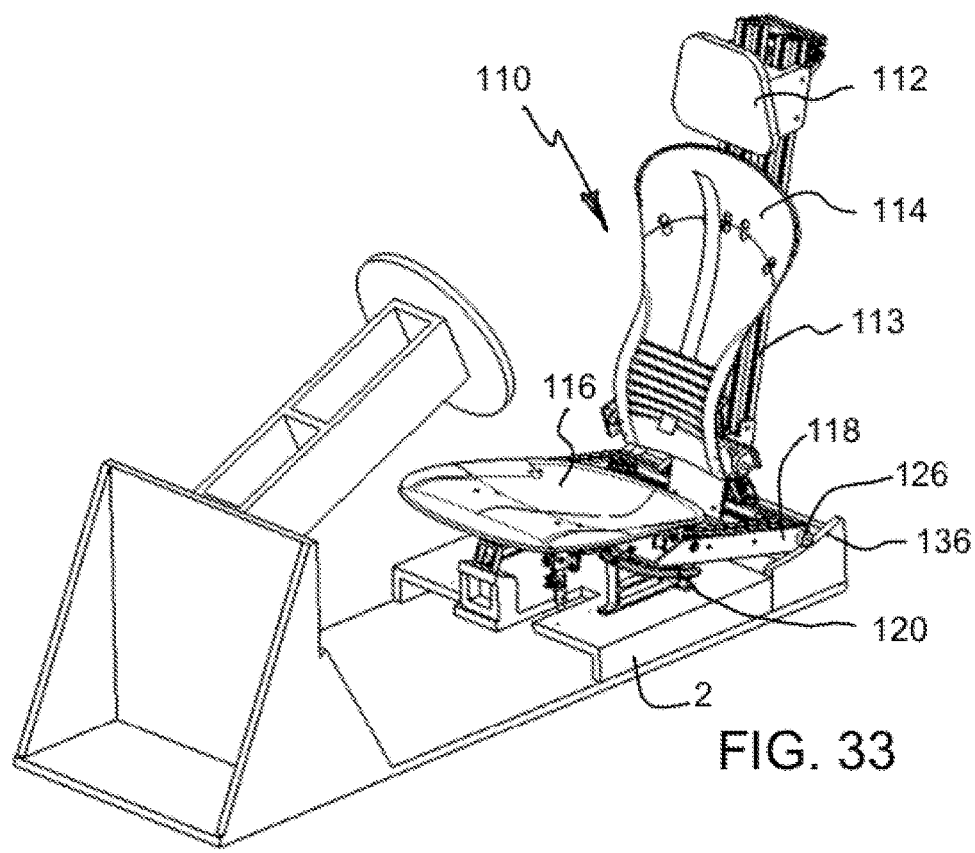
FIG. 33 is a perspective view showing a vehicle seat according to another embodiment of the invention.
Figure 34:
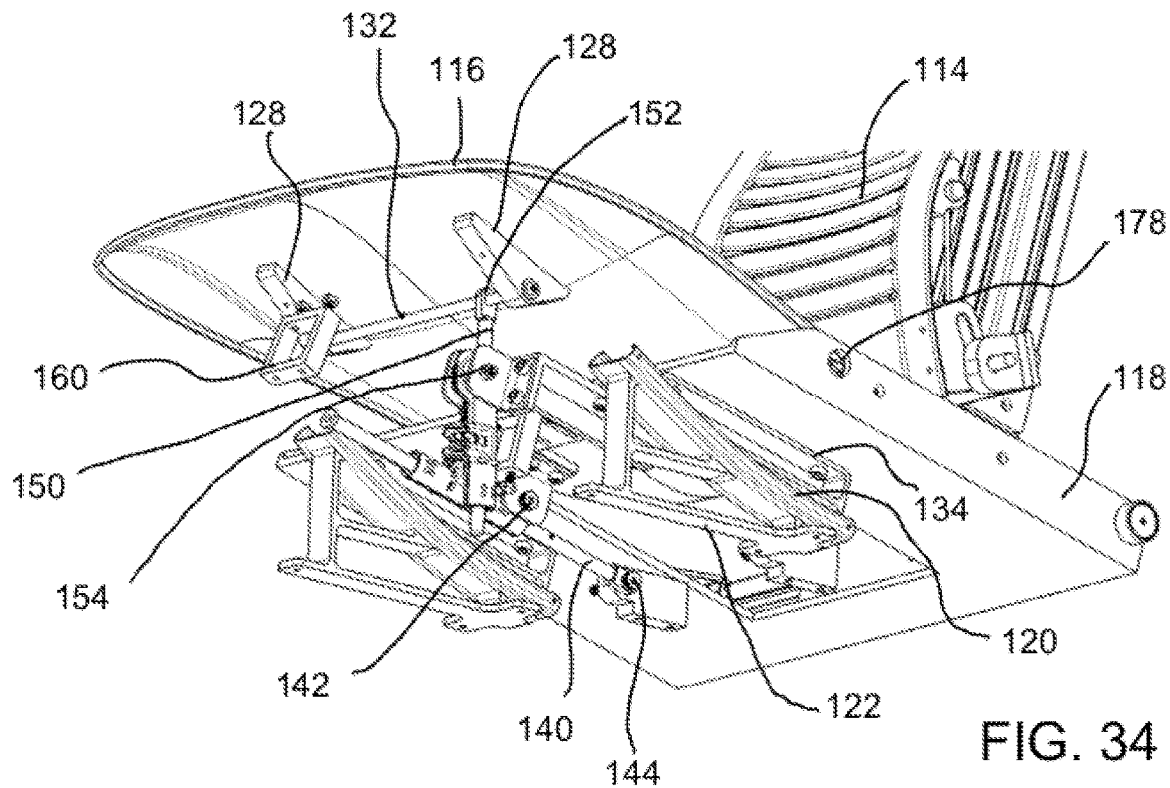
FIG. 34 is a partial perspective view of the vehicle seat according to FIG. 33, viewed from below.
Figure 35:
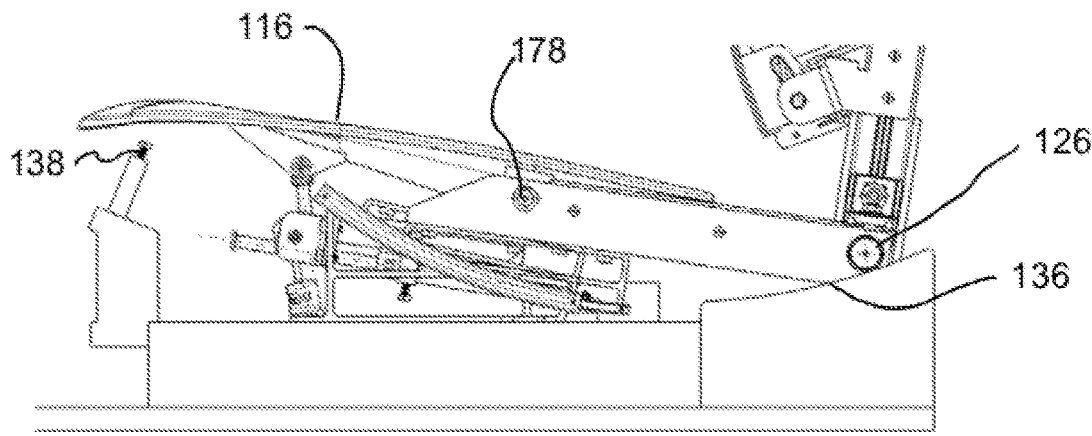
FIG. 35 is a partial side view of the vehicle seat according to FIG. 33, shown in the full upright position.
Figure 36:
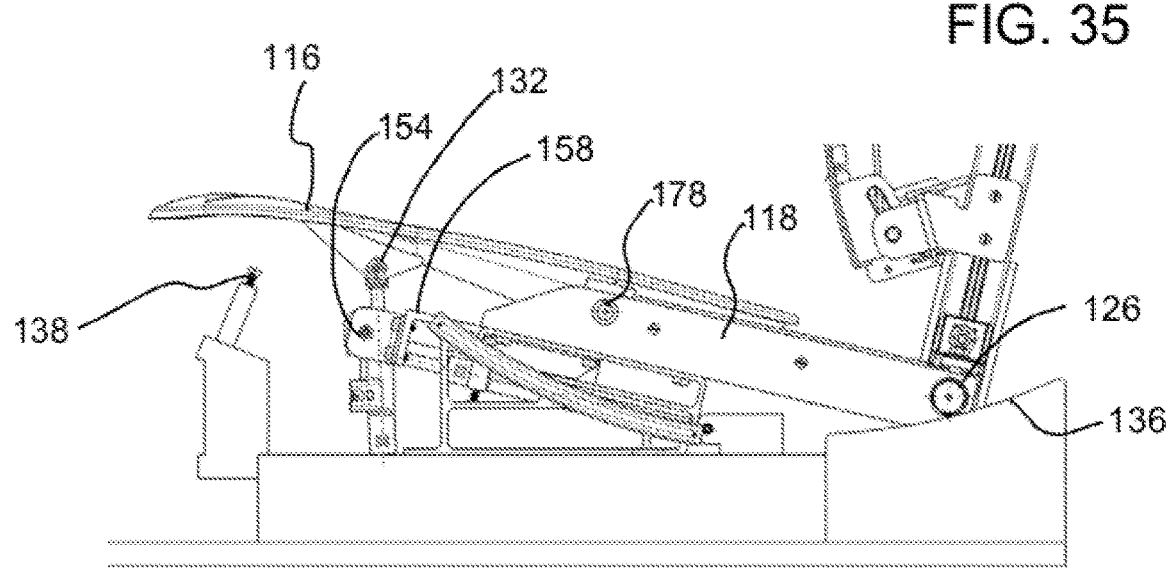
FIG. 36 is a partial side view of the vehicle seat according to FIG. 33, shown in the design position.
Figure 37:
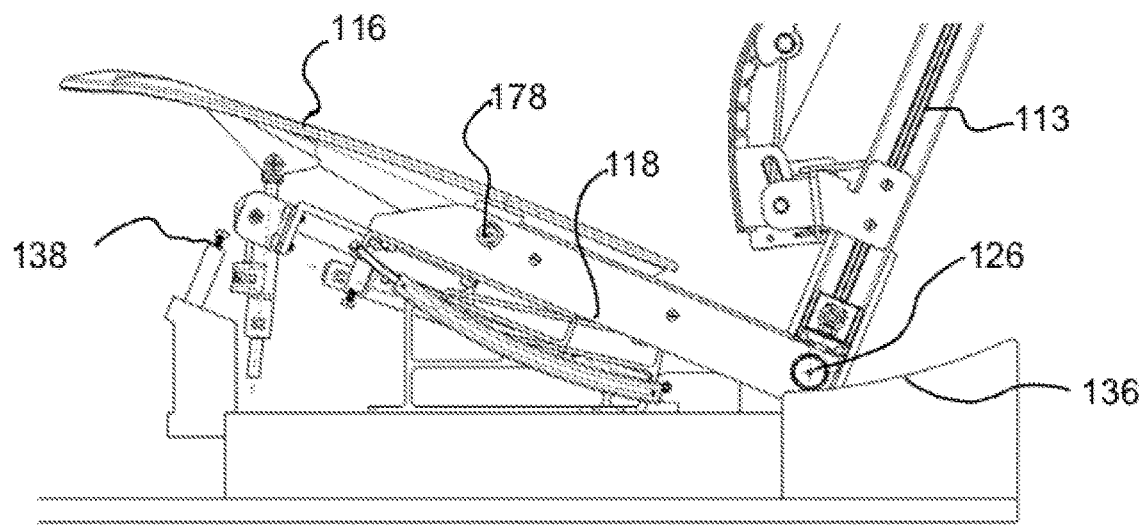
FIG. 37 is a partial side view of the vehicle seat according to FIG. 33, shown in the full recline (slouch) position.

FIG. 33 shows another vehicle seat generally designated 110, according to still another embodiment of the invention. The vehicle seat 110 includes many features in common with vehicle seats 10, 50 and 50'. A cushion 116 moves with a seatback 114 and a headrest assembly 112 and a back frame 113 through a full range of motion between a full upright position (FIG. 35) and a full recline (slouch) position (FIG. 37). However, within the full range of motion, including the design position shown in FIG. 36, some tilt adjustment of the cushion 116 is possible.

The vehicle seat 110 includes a cushion frame 118 connected by support blocks 134 to respective track followers 28 of curved tracks 120. The cushion frame 118 is movable along the curved tracks 120. The curved tracks 120 are supported by base mounting elements 122 relative to the cushion 2. The cushion frame 118 also includes rollers 126 at each side of the cushion frame 118. The rollers 126 each move along a curved roller support surface 136. The cushion 116 is connected to the cushion frame 118 at the cushion pivot 178. The cushion 116 includes front cushion blocks 128 which together support a cushion front adjustment bar 132. A manual linear actuator front adjustment pivot connection 152 connects the cushion linear actuator 150 to the cushion 116. The linear actuator 150 is also pivotably connected to the cushion frame 118 via connection block 158 at front linear actuator base connection 154. With this configuration, the occupant can move the cushion 116 about the cushion pivot 178 and set an angular position with the linear actuator 150. A cushion tilt return springs arrangement may optionally be provided to tilt the front of the cushion toward the occupant's thighs. This may be by applying a spring between a connection at the rear of the cushion 116 and a downward location—a lower base connection (not shown). This provides spring connections added in the back of the cushion with extension springs to tilt the cushion upward in the front. Torsion springs may also be added at the cushion pivot 178 or a compression spring may be provided under the front of the cushion. In addition, in a manner similar to the other vehicle seat embodiments, the cushion frame 118 may be biased toward a full recline position, based on a spring connection between the spring support 138 and the cushion frame 118. The cushion 116 may further include return spring support 160 which connects to a spring coupled to the support base 2, to bias the tilt angle of the cushion 116 towards the full recline position. The vehicle seat 110 includes two linear locking devices 140, each pivotably connected to the locking device cushion pivot 142 and pivotably connected to a locking device support base pivot 144. Based on the bias with a spring and the spring support 138, the vehicle seat 110 is biased toward the full recline position but can be moved toward the slouch position and set with the linear locking devices (actuators) 140 into any desired position, between the full upright position shown in FIG. 35 and the full recline (slouch) position shown in FIG. 37. With each of the vehicle seats 10, 50, 50' and 110, either one or more manual linear actuators (preferably with spring bias features) may be used to set positions or a powered linear actuator (preferably without spring bias features) may be used.

The vehicle seat 110 is similar to the vehicle seat 50 but includes additional features including the linear actuator 150 at the front of the cushion 116 that allows the occupant to set a desired cushion angle by shifting the weight of the occupant as the occupant moves to different recline positions. The cushion pivot 178 is located in the position below the occupant and forward of the occupant's H-point. The H-point is based on the hip joint of a 50th percentile male occupant, viewed laterally. The H-point is relevant to the global technical regulations (GTR) and the Society of Automotive Engineers (SAE) J1100 Interior Measurement Index, which sets parameters for such measurements as H30 (H-point to vehicle floor); H5 (H-point to pavement surface), H61 (H-point to interior ceiling) and H25 (H-point to window sill). With this configuration of the cushion pivot 178 in cooperation with the other features of the vehicle seat 110, the effort to tilt the cushion 116 and change the cushion angle is minimized. The cushion angle may also be spring-loaded based to bias the cushion 116 toward the occupant's thighs. This helps allow the cushion to follow the location of the occupant's legs. This allows the cushion 116 to actively tilt with the occupant's thighs as a heel point of the occupant also changes. The vehicle seat 110 allows movement of the seatback and headrest arrangement as well as the cushion pivot 178 of the seat cushion 116 as well as the seat cushion 116 as the vehicle seat moves from the full upright position shown in FIG. 35, through the design position shown in FIG. 36 to the full recline position (slouch position) shown in FIG. 37. In each of these positions, the user is able to adjust the inclination (tilt angle) of the cushion 116 and to set all positions, preferably simultaneously, by use of an actuator which actuates each of the linear actuators 140 and the linear actuator 150. This provides a large amount of adjustment. Further, the adjustment allows for the occupant to maintain constant contact between the surface of the cushion 116 and the occupant's thighs while he or she slouches/reclines.

While specific embodiments of the invention have been shown and described in detail to illustrate the application of the principles of the invention, it will be understood that the invention may be embodied otherwise without departing from such principles.

LIST OF REFERENCE CHARACTERS 2 support base
4 back frame seatback support (bulkhead/vehicle wall)
9 seatback pivot connection
10 vehicle seat
11 curved seatback track arrangement
12 headrest assembly
13 actuator
14 seatback (backrest)
15 link arm
16 cushion (seat base)
17 lower link arm part
18 cushion frame
19 headrest follower connection
20 curved tracks
21 track open region
22 base mounting element
24 forward support bracket
26 rear support bracket
28 track follower
30 ball bearings
32 forward movable support
34 rear movable support
36 spring cushion frame support
37 spring cushion support
38 spring base support
40 linear locking device
42 locking device cushion pivot
44 locking device support base pivot
50; 50' vehicle seat
52 headrest assembly
53 back frame
54 seatback
56 cushion
57 cushion front frame connection
58; 58' cushion frame
59 cushion frame crossmember
60 curved tracks
62 base mounting element
64 support bracket
66 cushion frame rollers
68 front cushion blocks
70 front cushion pins
72 rear cushion blocks
74 base slot bracket
75 base slot
76 curved roller support surface
77 cushion frame blocks
78; 78' cushion pivot
80 linear power device/linear locking device
82 linear power device cushion pivot
83 pivot bar
84 linear power device support base pivot 86 cushion carrier frame
87 spring cushion frame connection
88 spring base connection
89 spring support connection
90 rear curved short track
91 rear support bracket/track follower
92 forward curved short track
93 forward support bracket/track follower
95 cushion frame pivot connection
96 front track
97 front pivot
98 track follower
110 vehicle seat
112 headrest assembly
113 back frame
114 seatback (seatback)
116 cushion (cushion)
118 cushion frame
120 curved cushion tracks
122 base mounting element
126 cushion frame rollers
128 front cushion blocks
132 cushion front adjustment bar
136 curved roller support surface
138 spring support
140 linear locking device
142 locking device cushion pivot
144 locking device support base pivot
150 cushion adjust linear actuator
152 linear actuator front adjustment bar pivot connection
154 front linear actuator base connection
158 connection block
160 return spring support
178 cushion pivot

What is claimed is:

1. A vehicle seat comprising:
a cushion;
a seatback connected to the cushion; and
a track arrangement comprising a stationary curved fixed track and a movable track/ball bearing and cage track follower that is moveable along the stationary curved fixed track between a full slouch and a full upright position, the stationary curved fixed track being connected to a stationary vehicle seat support base and the moveable track/ball bearing and cage track follower being connected to the cushion.

2. A vehicle seat according to claim 1, further comprising:
a link arm;
a cushion pivot connection between the link arm and the cushion; and
a link arm and seatback pivot connection between the link arm and the seatback and the moveable track.

3. A vehicle seat according to claim 1, further comprising a cushion frame is connected to the movable track/ball bearing and cage track follower, wherein the cushion is pivotably mounted to the cushion frame at a cushion pivot.

4. A vehicle seat according to claim 3, further comprising a cushion tilt angle guide connected to the cushion and connected to the seat support to control a tilt angle of the cushion relative to the cushion pivot, during movement between the full slouch position and the full upright position, wherein the seatback is connected to the cushion for movement of the seatback between the full slouch position and the full upright position.

5. A vehicle seat according to claim 4, wherein the cushion tilt angle guide comprises a bracket defining a slot and a pin fixed to the cushion and following a path of the slot for limiting a pivot tilt of the cushion about the cushion pivot during movement between the full slouch position and the full upright position.

6. A vehicle seat according to claim 4, wherein the cushion tilt angle guide comprises a front track and a movable front track/ball bearing and cage track follower connected to the front track for following a path of the front track, the cushion being pivotably connected to the movable front track/ball bearing and cage track follower for limiting a pivot tilt of the cushion about the cushion pivot during movement between the full slouch position and the full upright position.

7. A vehicle seat according to claim 4, wherein the cushion tilt angle guide comprises a linear actuator pivotably connected to the cushion and pivotably connected to the cushion frame for setting a pivot tilt of the cushion about the cushion pivot during movement between the full slouch position and the full upright position.

8. A vehicle seat according to claim 3, wherein: the backrest is fixed to a backrest support comprising a back frame; the back frame is fixed to the cushion frame for movement therewith; the cushion frame carries rollers; and the vehicle seat support comprises a curved roller support surface on which the roller roll to support the cushion frame and the back frame.

9. A vehicle seat according to claim 8, wherein from the full upright to the full slouch position the back frame tilts rearward and the cushion tilts upward about the cushion pivot.

10. A vehicle seat according to claim 8, wherein from the full slouch position to the full upright position the back frame tilt forward and cushion tilts downward about the cushion pivot.

11. A vehicle seat according to claim 3, wherein the cushion is spring biased toward a tilt angle with respect to the cushion pivot.

12. A vehicle seat according to claim 1, wherein the stationary curved fixed track provides a cushion tilt, during movement between the full slouch position and the full upright position, to follow a movement of an occupant's legs, during movement between the full slouch position and the full upright position, when a same heel point is maintained.

13. A vehicle seat according to claim 1, further comprising a linear locking device with a pivot connection to the vehicle seat support and a pivot connection to the cushion.

14. A vehicle seat according to claim 1, wherein the movable track/ball bearing and cage track follower has at least a portion that is flexible between ball bearing cages to match a curve of the curved track.

15. A vehicle seat according to claim 1, wherein the track arrangement comprises:
two fixed curved tracks at one side of the vehicle seat and two fixed curved tracks at another side of the vehicle seat; and
a movable front track/ball bearing and cage track follower that is moveable along each of the two fixed curved tracks on each side of the vehicle seat between a full slouch and a full upright position.

16. A vehicle seat according to claim 1, wherein the cushion is spring biased toward one of the full slouch and a full upright position.

17. A vehicle seat comprising:
a cushion;
a seatback connected to the cushion;
a track arrangement comprising a stationary curved fixed track and a movable track/ball bearing and cage track follower that is moveable along the stationary curved fixed track between a full slouch and a full upright position, the stationary curved fixed track being connected to a stationary vehicle seat support base and the moveable track/ball bearing and cage track follower being connected to the cushion, a link arm;

a cushion pivot connection between the link arm and the cushion; and a link arm and seatback pivot connection between the link arm and the seatback and the moveable track.

* * * * *